United States Patent
Buslepp et al.

(10) Patent No.: US 8,510,016 B2
(45) Date of Patent: Aug. 13, 2013

(54) METHOD AND SYSTEM FOR CONTROLLING AN ENGINE USING IN-CYLINDER PRESSURE SENSOR SIGNALS

(75) Inventors: Kenneth J. Buslepp, Brighton, MI (US); Douglas R. Verner, Sterling Heights, MI (US)

(73) Assignee: GM Global Technology Operations LLC

( * ) Notice: Subject to any disclaimer, the term of this patent is extended or adjusted under 35 U.S.C. 154(b) by 957 days.

(21) Appl. No.: 12/609,407

(22) Filed: Oct. 30, 2009

(65) Prior Publication Data

US 2011/0106394 A1    May 5, 2011

(51) Int. Cl.
*G01M 15/00*    (2006.01)
*G06F 19/00*    (2011.01)
*G06F 7/00*     (2006.01)
*G06G 7/70*     (2006.01)

(52) U.S. Cl.
USPC ........ 701/102; 701/101; 701/115; 73/114.16; 73/114.17

(58) Field of Classification Search
USPC ................ 123/294, 297, 299, 300, 304, 305; 73/114.16, 114.17, 114.18, 114.26, 114.27, 73/114.28; 701/101, 102, 103, 104, 105, 701/106, 108, 111, 115
See application file for complete search history.

(56) References Cited

U.S. PATENT DOCUMENTS

| | | | |
|---|---|---|---|
| 5,076,098 A * | 12/1991 | Miwa .......................... | 73/114.17 |
| 5,738,074 A * | 4/1998 | Nakamura et al. ............ | 123/305 |
| 7,788,022 B2 * | 8/2010 | Hagari ......................... | 701/111 |
| 8,032,293 B2 * | 10/2011 | Binder et al. ................. | 701/111 |
| 2002/0026926 A1 * | 3/2002 | Loye et al. .................... | 123/435 |
| 2005/0211219 A1 * | 9/2005 | Strom et al. .................. | 123/299 |
| 2006/0293829 A1 * | 12/2006 | Cornwell et al. ............. | 701/114 |
| 2007/0021903 A1 * | 1/2007 | Christen et al. ............... | 701/108 |
| 2007/0142937 A1 * | 6/2007 | Yasui et al. .................... | 700/29 |
| 2007/0271025 A1 * | 11/2007 | Yasui et al. .................... | 701/102 |
| 2009/0112449 A1 * | 4/2009 | Binder et al. ................. | 701/111 |
| 2009/0158831 A1 * | 6/2009 | Cornwell et al. ........... | 73/114.16 |

* cited by examiner

*Primary Examiner* — Stephen K Cronin
*Assistant Examiner* — Raza Najmuddin

(57) ABSTRACT

A method and a control system that includes a window module that determines a piston position window, a mean effective pressure determination module that generates a mean effective pressure with in-cylinder pressure signals within the piston position window and an engine control module that controls the engine using the mean effective pressure.

16 Claims, 7 Drawing Sheets

METHOD AND SYSTEM FOR CONTROLLING AN ENGINE USING IN-CYLINDER PRESSURE SENSOR SIGNALS

FIELD

The present disclosure relates generally to a method and system for controlling an engine, and, more specifically to a method and system for controlling an engine using in-cylinder pressure sensor signals.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One sensor that may be used within a vehicle is an in-cylinder pressure sensor. The in-cylinder pressure sensor provides feedback for operating the engine. The in-cylinder pressure sensor signal may have a significant amount of noise. Low-pass filtering with a band pass filter may distort the signal to unacceptable levels so that pressure data may not meet the accuracy requirements for the entire engine cycle.

Cylinder pressure sensing may be used to control various functions in an engine. In a homogenous charge compression ignition (HCCI) engine, a level of heat released during a compression cycle may be used to control the engine. The amount of heat released may be determined in part using the in-cylinder pressure sensor. However, because of the high signal noise associated with the in-cylinder pressure sensing, it is difficult to resolve the low level of heat released during an HCCI exhaust recompression cycle.

SUMMARY

The present disclosure provides a system and method for generating in-cylinder pressure sensor signals and controlling an engine therewith.

In one aspect of the disclosure, a method for controlling an engine includes generating in-cylinder pressure signals, determining an engine position window, determining a piston position window, when the engine position is within the window, generating a mean effective pressure with in-cylinder pressure readings from within the window, and controlling the engine using the mean effective pressure.

In another aspect of the disclosure, a system for controlling an engine includes a window module that determines a piston position window, a mean effective pressure determination module that generates a mean effective pressure with in-cylinder pressure signals within the window and an engine control module that controls the engine using the mean effective pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
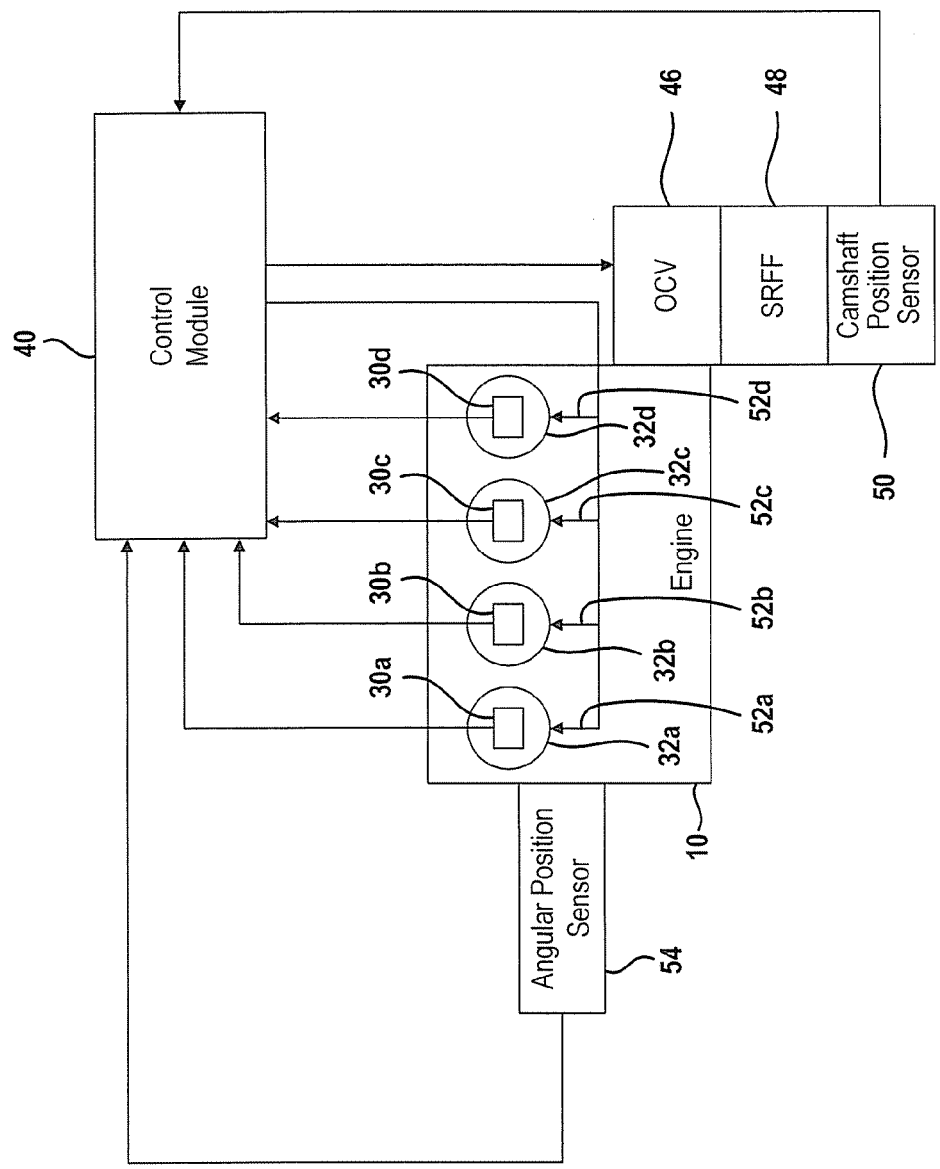
FIG. 1 is a block diagrammatic view of the control system of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 may include in-cylinder pressure sensors 30A, 30B, 30C and 30D in respective cylinders 32A-32D. Each in-cylinder pressure sensor 30A-30D generates an in-cylinder pressure signal that is communicated to a control module 40. The control module 40 may be an engine control module. Although only four cylinders 30A-30D are shown, the engine may include many different numbers of cylinders and corresponding pressure sensors.

The engine 10 may be a variable valve timing engine that includes an oil control valve (OCV) 46 used to control switchable roller finger followers 48. Of course, the present disclosure may apply to various other types of engines.

The control module 40 may include a controller for the oil control valve 46 that is used to control the flow of oil that is used to control the switchable roller finger followers 48.

A camshaft position sensor 50 may also provide an angular position signal to the control module 40. The camshaft position sensor indicates a position and thus the expected valve position for valves 52a-52d. When the valves 52a-52d are operating properly as indicated by the in-cylinder pressure, a fault in the camshaft position sensor 50 may be determined.

The control module 40 thus indirectly controls the operation of valves 52a, 52b, 52c and 52d and can determine the stability of operation thereof. Although only one valve is illustrated for simplicity, each cylinder includes at least one intake valve and at least one exhaust valve. Multiple intake and exhaust valves may also be provided. The control module 40 may manage the torque of the engine and generate pressure-volume curves corresponding to the operation of the engine.

The control module 40, as will be further described below, may be used to generate a mean effective pressure (MEP) using the pressure sensors 30A-30D. The mean effective pressure may be used to calculate the heat released which in turn may be used to generate a determination of the amount of fuel burned during a recompression cycle in an HCCI engine. The amount of fuel burned may provide an indication of the remaining fuel that is ready to be burned. The amount of fuel burned may also be used to control the amount of oxides of nitrogen generated from the combustion process within the cylinders.

An angular position sensor 54 may generate an angular position signal corresponding to the angular position of the crankshaft of the engine. The angular position of the crankshaft corresponds to the piston position. The angular position signal may be provided to the control module 40. More than one of the angular position sensor signal and the magnitude or amplitude of the pressure sensor signal may be used by the control module in determining filter coefficients for filtering the pressure sensor signals as will be described below.

The angular position sensor 54 may not provide the resolution required for precise control in an HCCI engine. By monitoring the pressure, the absolute zero torque position may be generated with further resolution. By using the mean effective pressure to obtain a zero torque position, absolute zero torque position may yield the top-dead-center of the cylinder. The top-dead-center may be resolved to about 0.2 to 0.4 degrees. This will allow more precise control of the HCCI process.

Figure 2:
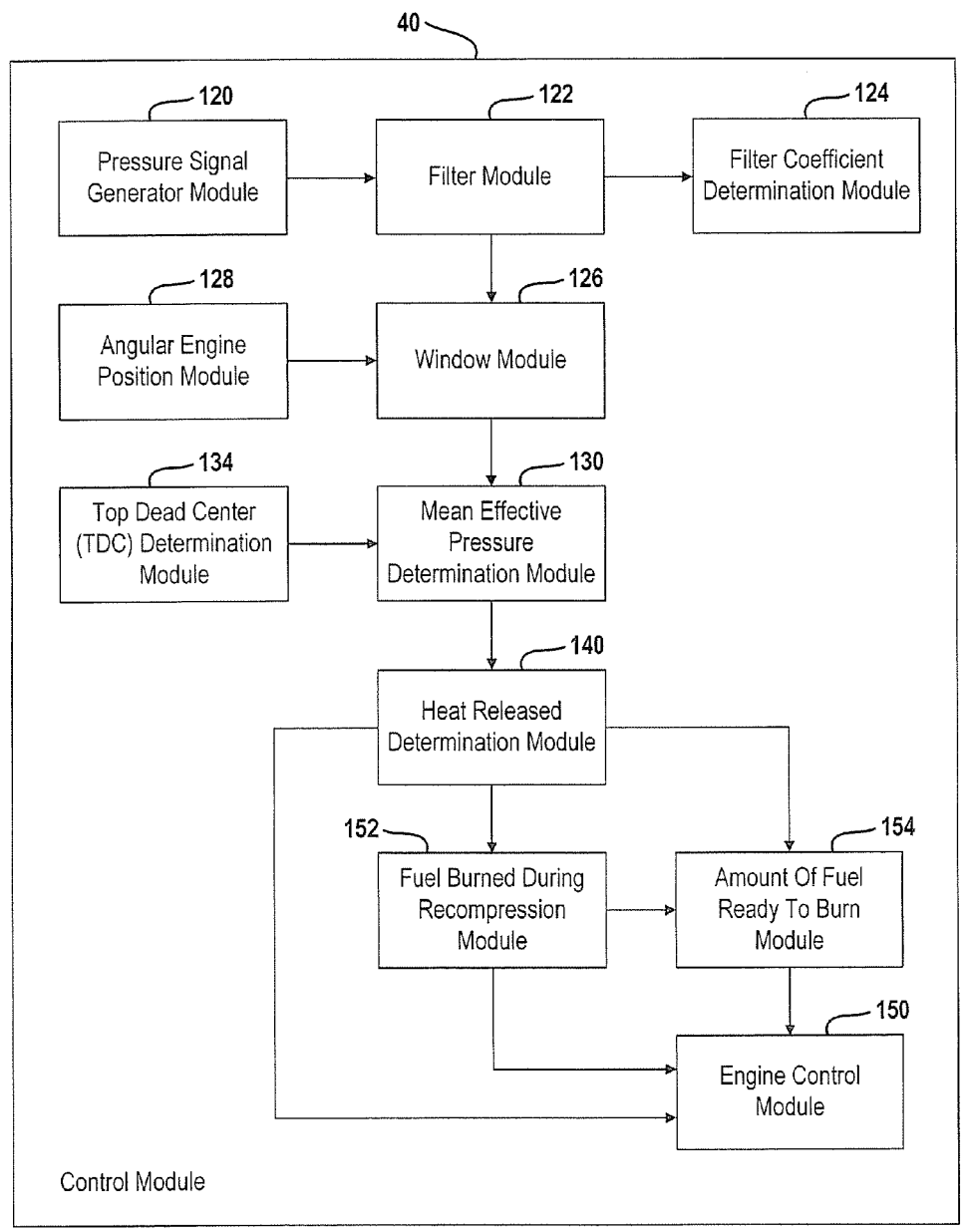
FIG. 2 is a block diagrammatic view of a control module according to the present disclosure.

Referring now to FIG. 2, the control module 40 of FIG. 1 is illustrated in further detail. The control module 40 may include a pressure signal generator module 120. Each of the pressure sensors 30A-30D may be used to generate a pressure signal. The pressure signal generator module 120 may receive the pressure signals from the pressure sensors and convert them into a form usable by other modules within the control module. As will be described below, each of the pressure signals from each of the cylinders may be used.

A filter module 122 is used to filter the pressure signals from the pressure signal generator module 120. Various types of filters may be used. For example, the filter module 122 may include a finite impulse response digital filter having various coefficients. Also, an infinite impulse response filter may be used.

The filter module 122 may receive filter coefficients from a filter coefficient determination module 124. The filter coefficient determination module 124 may generate filter coefficients based upon various engine operating conditions. The engine operating conditions may include determining a torque or engine load. The load-determination module may determine the engine load or torque based upon various inputs such as an accelerator pedal input.

By way of example, the filter coefficient determination module 124 may vary the filter coefficients based upon the load (torque) of the engine. Thus, the filter coefficients may be changed during various loading conditions. Likewise, based upon the angular position of the camshaft or crankshaft, the filter coefficients may be changed. Thus, over the operation of the engine the filter coefficients may be varied. In one example, the filter coefficients may be changed from a first set to a second set when the load (torque), position or magnitude increases above a threshold and changes back to the first set of coefficients when below the threshold. Of course, several thresholds may be provided at various intervals of load, pressure signal amplitude or angular position. By way of example, the filter coefficients may be relaxed or changed at 20 degrees before top-dead-center and resume normal operation 60 degrees after top-dead-center. This provides operation for two different sets of coefficients based on position of the crankshaft. The relaxation in the filter coefficients may be configured to shift the filter gain by three decibels. Optimum filter values and positions may be determined based upon engine calibrations. The filter coefficients may be calibrated during the development of the engine. The filter coefficients may be obtained from a look-up table or calculated during the engine operation process.

A window module 126 may receive the filtered pressure signals. The window module 126 may be in communication with an angular engine position module 128. The angular engine position module 128 may provide angular engine position signals to the window module 126. The angular position corresponds to the position of the cylinders within the engine. The window module 126 may provide pressure signals that are within a window or range of engine or piston positions to a mean effective pressure determination module 130. Pressure signals that fall outside of the window may not be used in mean effective pressure calculation. One example of the piston position window is between 90° before top-dead-center and 90° after top-dead-center. The window module 126 can also be set to be smaller such as between 60° below top-dead-center and 60° after top-dead-center. The window may even be made smaller such as between 50° below top-dead-center and 50° after top-dead-center. The window size may vary depending on the amount of noise present in the pressure signals from each cylinder. The window size may be set during a calibration procedure and stored within a memory of the control module 40 from the manufacturer of the vehicle.

The mean effective pressure determination module 130 may generate a mean effective pressure based upon the pressure signals within the window. The Cylinder Pressure measured at the start of the determined window and at the end of this window may also be used to enhance the reformation burn MEP calculation by using the ratio of the cylinder volume swept during the unmeasured window, to the entire swept volume of the cylinder. (Pend−Pstart)×Unmeasured Swept Volume/Total Swept engine Volume, added to the iterative calculation of MEP during reformation. The mean effective pressure determination module 130 may be used to determine the top-dead-center (TDC) in the top-dead-center determination module 134. The top-dead-center determination module 134 may use the mean effective pressure to determine a zero torque position that corresponds to the top-dead-center. The top-dead-center determination may be more accurate than that of the crank shaft position sensor. For example, resolution to between about 0.2° and 0.4° was achieved in a test vehicle.

Referring back to the mean effective pressure determination module 130, the mean effective pressure determination module 130, may also communicate the mean effective pressure signal to a heat released determination module 140. The heat released determination module 140 may communicate the heat release determination to the engine control module 154 for further control. The heat released determination module 140 may also provide the heat released to a fuel burned during recompression module 152. The fuel burned during recompression may be detected using the heat released. In the recompression cycle, the exhaust valve is closed earlier so that the trapped exhaust is recompressed as the cylinder approaches top-dead-center. Fuel may be injected during recompression. Because the volume and pressure are known, the amount of heat released may be determined. The amount of fuel burned may correspond directly to the heat released. The heat released during recompression may be less than one joule per degree of crank shaft angle.

The amount of fuel ready to burn module 154 may determine an amount of fuel that is ready to be burned after the fuel burned during recompression is determined. The amount of fuel injected into the cylinder is known so therefore by subtracting the fuel burned during the recompression the amount of fuel that is ready to be burned may be generated. The engine control module 150 may use the fuel burned during recompression or the amount of fuel ready to burn or both in controlling various engine functions. The engine functions being controlled may include the timing of fuel injection, the timing of spark, or both.

Figure 3:
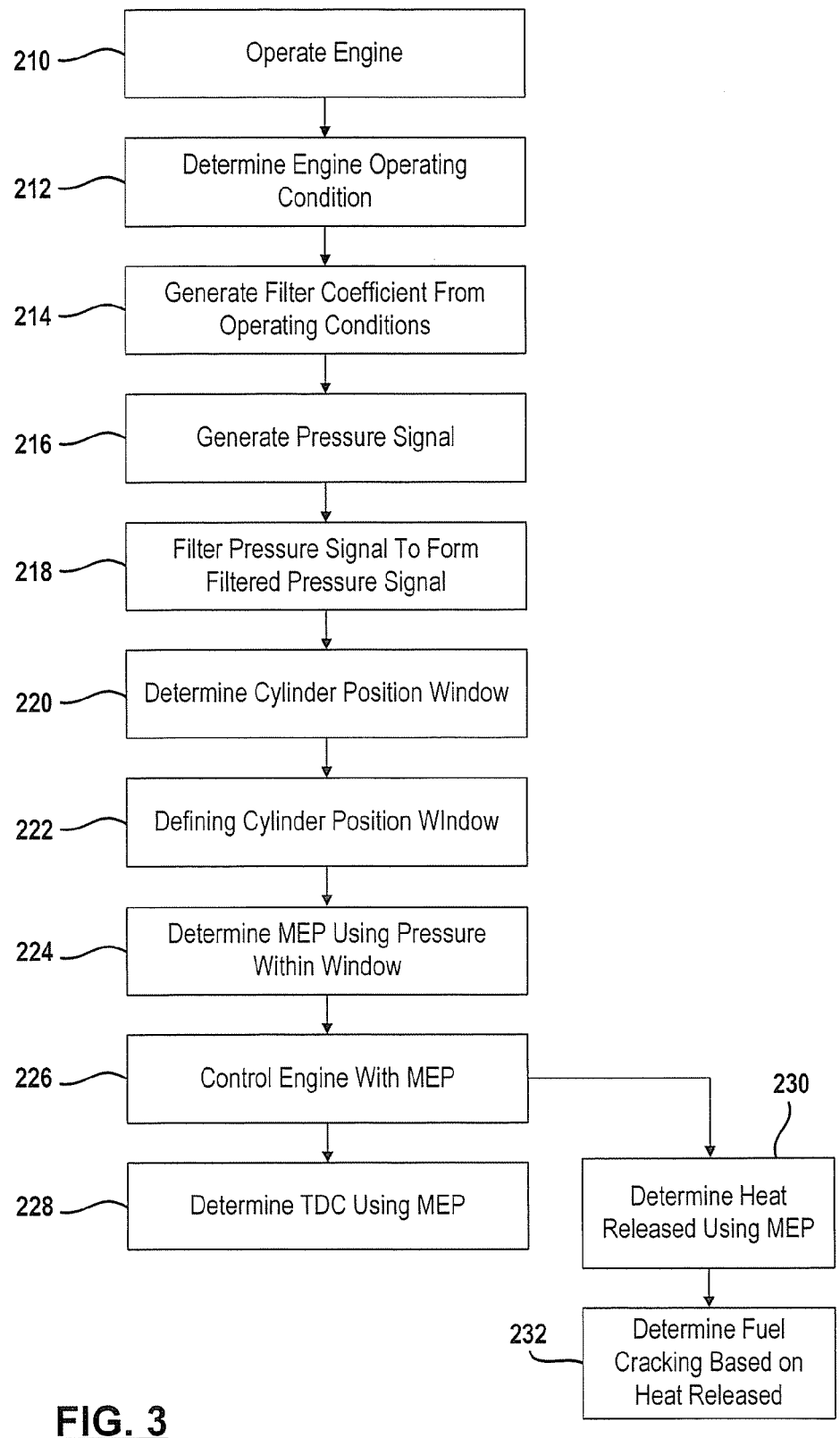
FIG. 3 is a flowchart of a method for operating an engine using in-cylinder pressure sensors.

Referring now to FIG. 3, a method of operating the engine is illustrated. In step 210, the engine is operated. In step 212, the engine operating conditions are determined. As mentioned above, the load may be determined and the amplitude of the pressure signals may be determined.

The filter coefficients may be generated based upon the engine operating conditions in step 214. The filter coefficients may vary based upon one or more of the load, angular position or the amplitude of the pressure signal.

In step 216, the pressure signal from the pressure sensor is generated. As described above, more than one pressure signal may be generated. Also, one pressure signal per cylinder may be generated.

In step 218, the pressure signal is filtered to form a filtered pressure signal based upon the filter coefficients. The filter may be a finite impulse response (FIR) filter or an infinite impulse response (IIR) filter. Of course, other types of filters having digital coefficients may be used.

In step 220, the cylinder position may be determined. The cylinder position may be determined using the crank angle. In step 222, a cylinder position window may be defined. The cylinder position window may be defined so that low noise pressure signals are used for the following calculations. The cylinder window, as described above, may be various sizes including a predetermined amount before and after top-dead-center. For example, a cylinder window 90° before top-dead-center and 90° after top-dead-center may be used. Likewise, 60° both before and after top-dead-center and 50° below top-dead-center may be used. The width of the window may vary depending upon the characteristics of the engine and the operating noise within the engine. In step 224, the mean effective pressure using pressure signals that fall within the cylinder position window is determined. In step 226, the engine may be controlled using the mean effective pressure.

The engine may be controlled with a top-dead-center determination using the mean effective pressure in step 228. This process was described above.

The engine may also control other functions including determining heat released during a recompression mode in step 230. By determining the heat released, the amount of fuel cracking may be determined in step 232. Fuel cracking is generally used to describe the amount of fuel that is ready to be burned. By knowing the amount of heat released in step 230, the amount of fuel cracking in step 232 may be determined. The amount of fuel cracking may be used to control the amounts of oxides of nitrogen generated in the combustion process.

Figure 4:
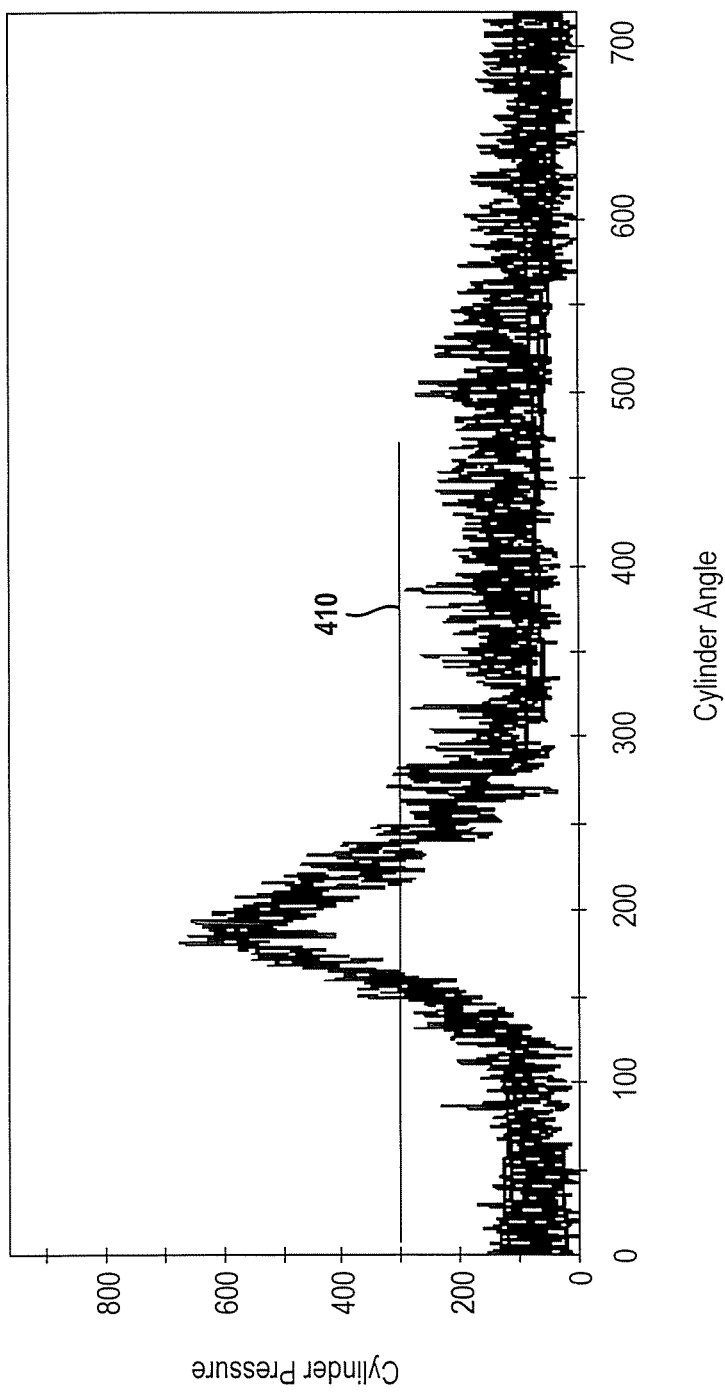
FIG. 4 is a plot of a filtered pressure signal.

Referring now to FIG. 4, noise suppression has been provided with coefficients based upon the position of the crankshaft. A line 410 corresponding to 300 kilopascals is provided on the graph. The line 410 corresponds to crank angles within the window. Thus, as can be seen, the less noisy peak signal may be used in the calculation of heat released and mean effective pressure.

Figure 5:
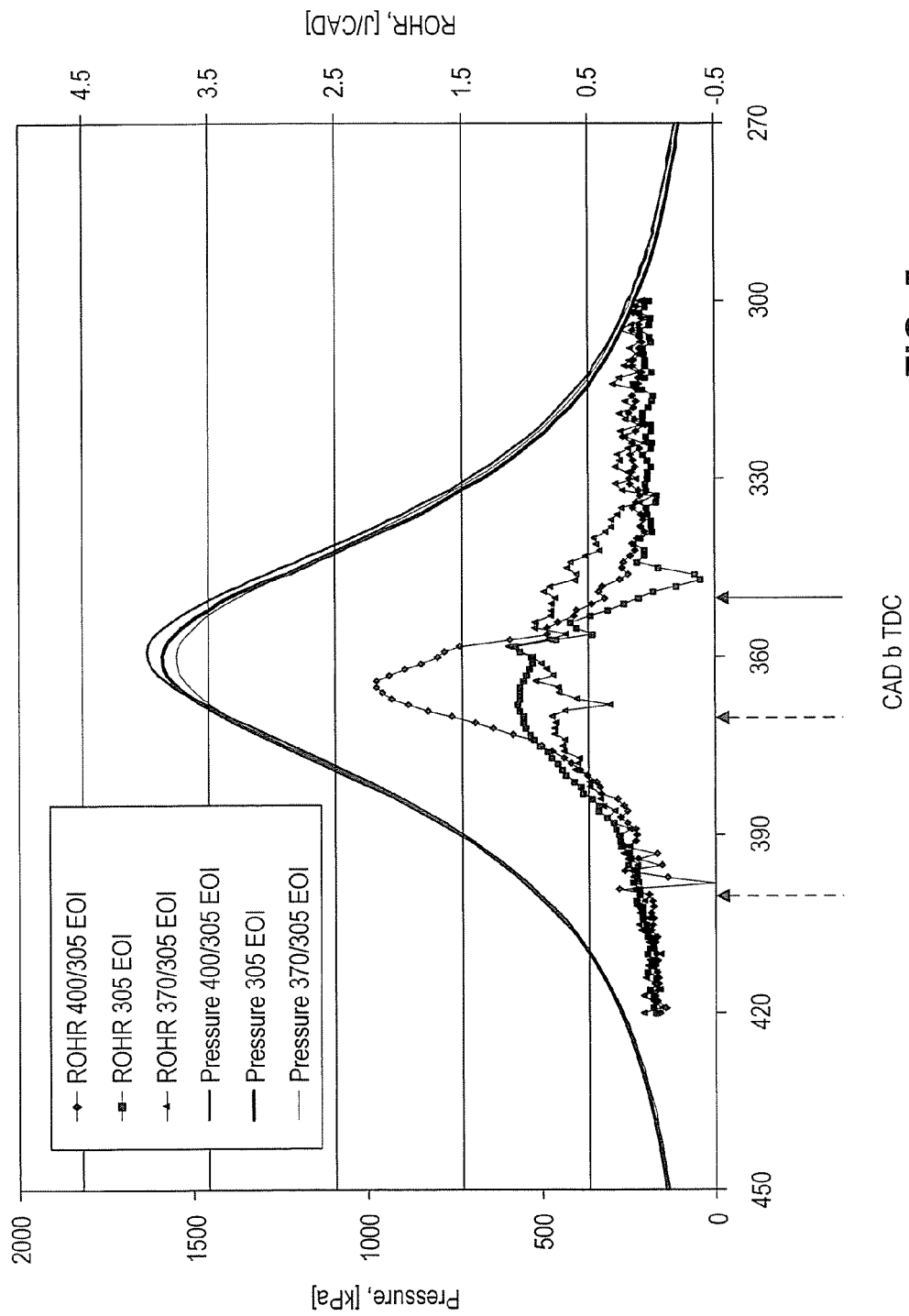
FIG. 5 is a plot of pressure versus crank angle for various heat releases and pressures at various ends of injections (EOIs).

Referring now to FIG. 5, the rate of heat release and pressure is plotted for various cylinder positions between 450° and 270° before top-dead-center with different end of injections (EOI).

Figure 7:
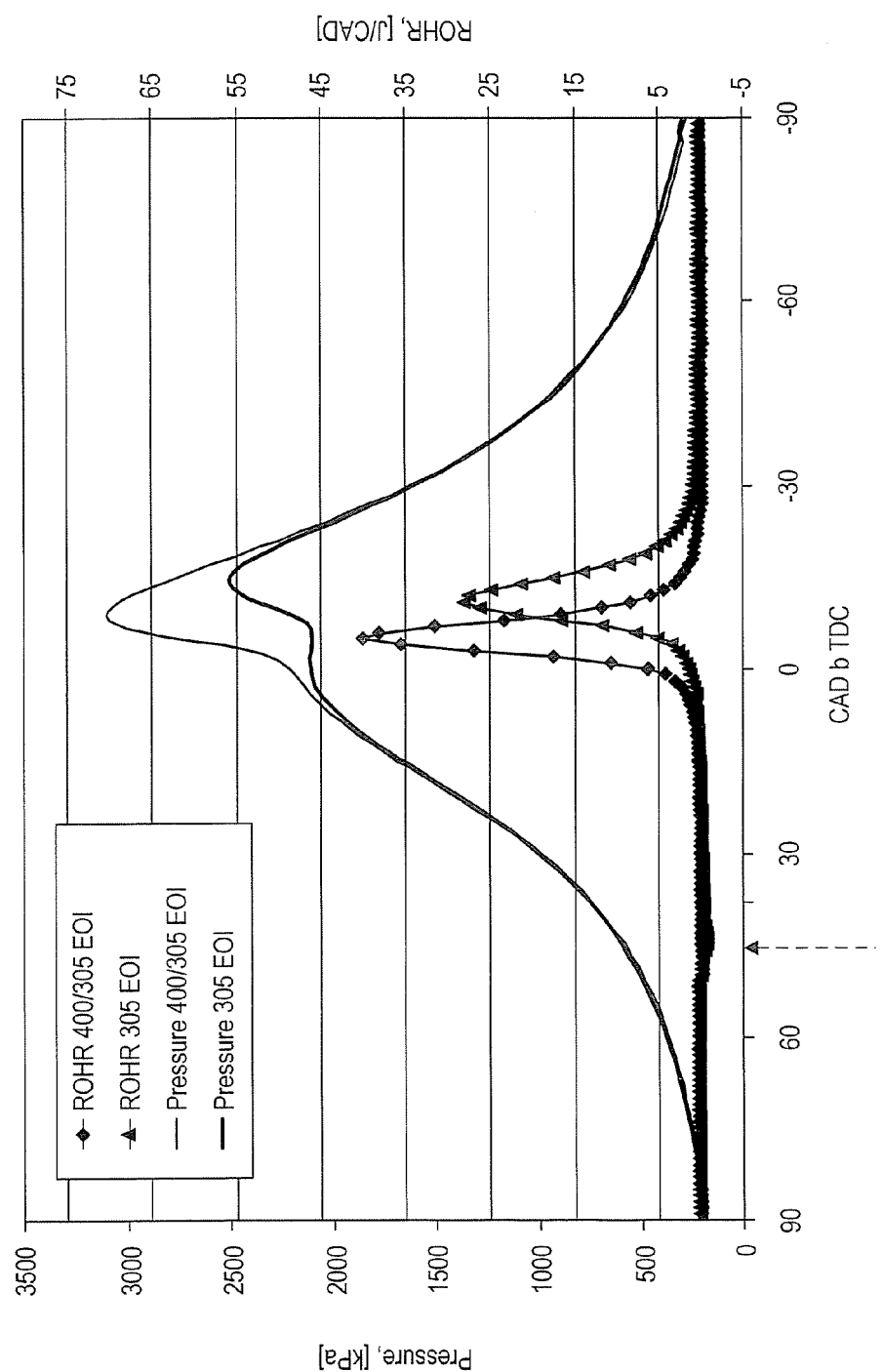
FIG. 7 is a plot of pressure and rate of heat release for a 45° and 360° end of injection for a re-breathing mode.

Referring now to FIG. 7, a work cycle burn illustrating different re-breathing pressures and re-breathing rate of heat release versus engine position is illustrated. As can be seen, the fuel burn may vary depending on the end of injection.

Figure 6:
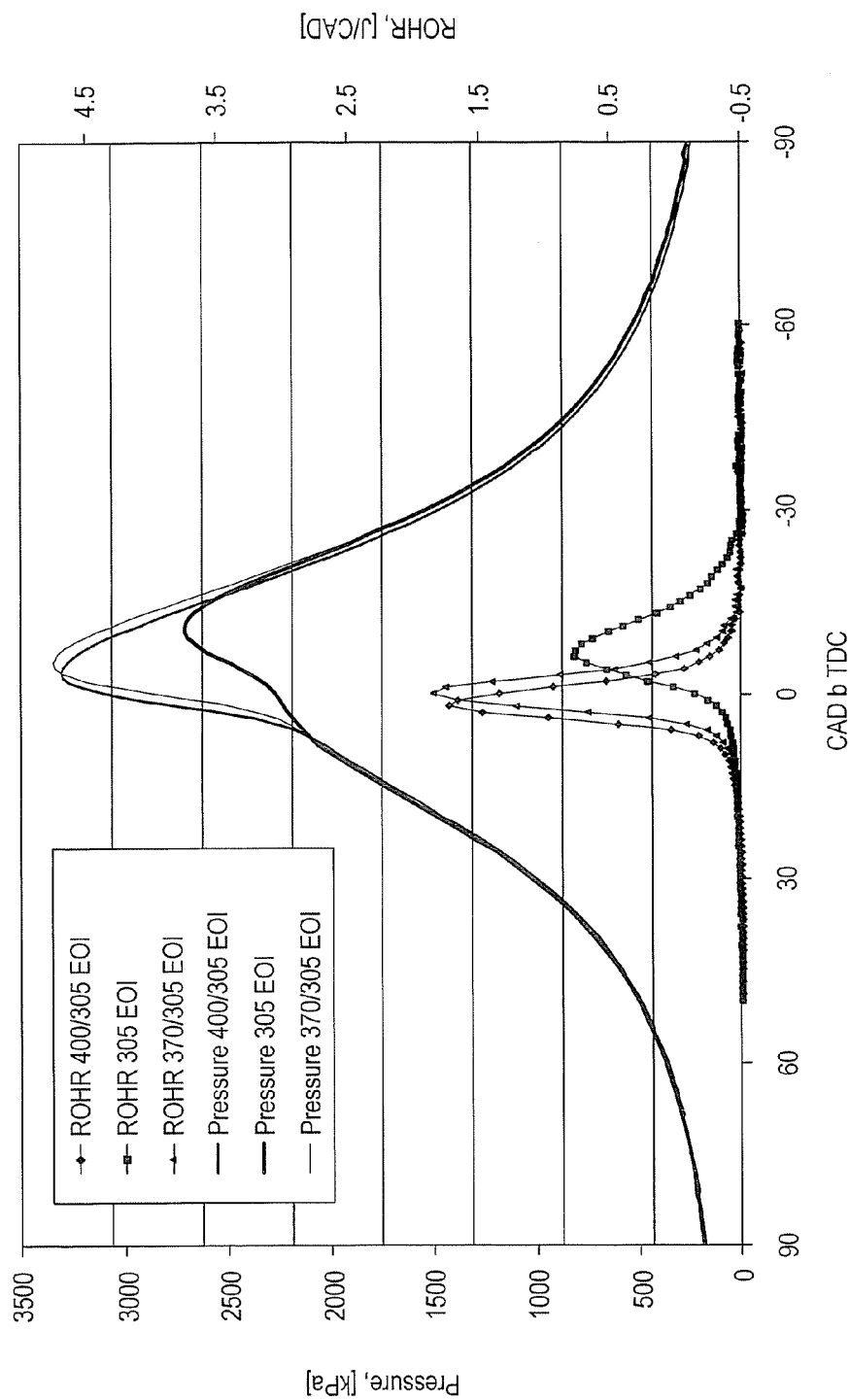
FIG. 6 is a plot of pressure versus crank for the top-dead-center area for various pressures and the rate of heat releases around top-dead-center.

FIG. 6 is a plot similar to FIG. 5 except the cylinder position shown is between 90° before top-dead-center and 90° after top-dead-center.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling an engine comprising:
generating in-cylinder pressure signals using a cylinder pressure sensor;
setting filter coefficients for a filter based upon an engine operating condition;
filtering the in-cylinder pressure signals with the filter to form filtered pressure signals;
determining a piston position window;
determining a piston position; generating a mean effective pressure based on the filtered pressure signals from within the piston position window; and
controlling the engine using the mean effective pressure.

2. The method of claim 1 further comprising:
determining a top-dead-center position in response to the mean effective pressure; and
controlling the engine in response to the top-dead-center position.

3. The method of claim 1 further comprising:
determining an amount of heat released based on the mean effective pressure; and
controlling the engine in response to the heat released.

4. The method of claim 3 further comprising:
determining fuel cracking in response to the heat released; and
controlling the engine in response to the fuel cracking.

5. The method of claim 1 wherein the piston position window is between 90 degrees before top-dead-center and 90 degrees after top-dead-center.

6. The method of claim 1 wherein the piston position window is between 50 degrees before top-dead-center and 50 degrees after top-dead-center.

7. The method of claim 1 wherein controlling the engine comprises controlling an HCCI engine.

8. A control system for controlling an engine comprising:
a window module that determines a piston position window;
a filter coefficient determination module that sets filter coefficients for a filter based upon an engine operating condition;
a filter module that receives in-cylinder pressure signals and that filters the in-cylinder pressure signals with the filter to form filtered pressure signals;
a mean effective pressure determination module that generates a mean effective pressure based on the filtered pressure signals within the piston position window; and
an engine control module that controls the engine using the mean effective pressure.

9. The control system of claim 8 further comprising a top-dead-center determination module that determines a top-dead-center cylinder position in response to the mean effective pressure,
wherein the engine control module controls the engine in response to the top-dead-center position.

10. The control system of claim 8 further comprising a heat released module that determines an amount of heat released based on the mean effective pressure,
   wherein the engine control module controls the engine in response to the heat released.

11. The control system of claim 10 further comprising a fuel burned module that determines fuel burned in response to the heat released,
   wherein the engine control module controls the engine in response to the fuel burned.

12. The control system of claim 8 wherein the piston position window is between 90 degrees before top-dead-center and 90 degrees after top-dead-center.

13. The control system of claim 8 wherein the piston position window is between 50 degrees before top-dead-center and 50 degrees after top-dead-center.

14. A system comprising:
   a homogeneous charge compression ignition engine; and
   the control module of claim 8.

15. The control system of claim 8 wherein the filter coefficient determination module sets the filter coefficients for the filter based on at least one of an engine load, a crankshaft position, and a camshaft position.

16. The method of claim 1 further comprising setting the filter coefficients for the filter based on at least one of an engine load, a crankshaft position, and a camshaft position.

* * * * *